United States Patent
Andresen et al.

(10) Patent No.: US 6,321,277 B1
(45) Date of Patent: Nov. 20, 2001

(54) SEPARABLE IN-LINE AUTOMATIC TERMINATOR FOR USE WITH A DATA PROCESSING SYSTEM BUS

(75) Inventors: Mark E. Andresen; Brian A. Carpenter, both of Cary; Andrew Boyce McNeill, Jr., Apex; Thomas Harold Newsom, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/193,327

(22) Filed: Nov. 16, 1998

(51) Int. Cl.[7] .............................. G06F 13/14; G06F 13/20
(52) U.S. Cl. .............................. 710/8; 710/100; 710/101; 710/126; 710/129; 710/15; 710/18; 714/3
(58) Field of Search .................................... 710/100, 126, 710/129, 15, 18, 8, 101; 714/3

(56) References Cited

U.S. PATENT DOCUMENTS

| | | | | |
|---|---|---|---|---|
| 5,706,447 | * | 1/1998 | Vivio | 395/309 |
| 5,734,208 | * | 3/1998 | Jones | 307/139 |
| 5,805,219 | * | 9/1998 | Ejima et al. | 348/375 |
| 5,870,571 | * | 2/1999 | Duburcq et al. | 395/309 |
| 6,029,216 | * | 2/2000 | Hoglund et al. | 710/101 |
| 6,061,806 | * | 5/2000 | Caldwell et al. | 714/3 |
| 6,092,131 | * | 7/2000 | Caldwell et al. | 710/100 |

* cited by examiner

*Primary Examiner*—Thomas Lee
*Assistant Examiner*—Rehana Perveen
(74) *Attorney, Agent, or Firm*—Bracewell & Patterson, LLP

(57) ABSTRACT

A method and system for automatically providing termination to a SCSI I/O bus within a data processing system is disclosed. An inline terminator is provided for use within a data processing system. The inline terminator provides a connection between a first controller and an I/O bus utilizing a plurality of connection pins including a device removal detection pin. The inline terminator includes a terminator circuit and a control circuit coupled to the device removal detection pin to detect whether the controller and bus are connected. In one embodiment, the detection pin is a short ground pin on the SCSI bus that is not associated with a signal or differential signal pair. The terminator circuit is activated when the controller and bus are disconnected and deactivated otherwise to automatically terminate the I/O bus.

13 Claims, 5 Drawing Sheets

SEPARABLE IN-LINE AUTOMATIC TERMINATOR FOR USE WITH A DATA PROCESSING SYSTEM BUS

BACKGROUND OF THE INVENTION

1. Technical Field

The present invention relates to an improved method and system for providing access to a peripheral device within a data processing system in general and, in particular, to an improved method and system for providing access to a SCSI peripheral device within a data processing system. Still more particularly, the present invention relates to an improved method and system for providing access to a SCSI peripheral device by automatically providing termination on a SCSI I/O bus within a data processing system.

2. Description of the Related Art

To provide more reliable access to stored data, many conventional data processing systems now utilize high availability (HA) data storage subsystems. An HA data storage subsystem provides redundant controllers as alternate points of access to a data resource to improve the reliability with which the resource may be accessed. This use of redundancy allows either controller to be removed from the system and serviced while an alternate controller is in operation, providing access to stored data. In HA systems, data storage devices such as hard disk drives attach to a data processing system by connecting to an expansion or I/O (input-output) bus. I/O buses typically implement a bus standard such as the Small Computer System Interface (SCSI) to provide a communication interface between peripheral I/O devices and the data processing system to which they are coupled.

Data processing systems implementing the SCSI bus standard utilize a device called a controller, or interface adapter card, such as the ServeRAID II Ultra SCSI Adapter, developed by International Business Machines (IBM) Corporation of Armonk, N.Y., to communicate with peripheral devices over a SCSI bus. A controller card connects to a host within the data processing system through a card expansion slot while a channel located on the controller card is coupled to up to fifteen peripheral SCSI devices via a SCSI bus. For external devices, this is accomplished by connecting the channel to one end of a daisy chain of peripheral SCSI devices connected together using SCSI bus cable. While this bus structure allows peripheral devices to communicate with each other independently of the host, the open-air impedances present at the end of the chain of devices and at the controller create a reflective barrier to data and command signals. Signals reflected by these barriers interfere with subsequent signal transmissions, causing bus misoperation and frequently, SCSI bus failure. As a result, SCSI standards promulgated by the American National Standards Institute (ANSI) herein incorporated by reference (SCSI 1: X3.131-1986 and SCSI 2: X3.131.1994), require that the physical ends of SCSI buses be modified to prevent signal reflection.

Termination is an electrical requirement prescribed by the ANSI SCSI standard to prevent signal reflection and ensure proper SCSI bus operation. Termination is accomplished by connecting a circuit, the terminator, to the physical ends of the SCSI bus. The terminator provides an impedance that matches the impedance of the SCSI bus cable thereby preventing spurious reflected signals. In conventional, non-HA SCSI systems, a terminator is incorporated into the controller at one end of the bus, while a second terminator is connected to or incorporated into the final device in the SCSI chain. Power may be provided to either terminator by any device on the daisy chain. Termination power may be provided by an associated device or a remote device via a termination power line on the SCSI bus. The SCSI standard provides that termination must occur at and only at both ends of the SCSI bus.

The SCSI standard provides several methods for matching the impedance of a SCSI bus. The generally preferred termination method, known as active termination, uses a matched impedance (a 110 ohm resistor) on each signal line connected to a voltage regulator. In order to function properly, SCSI terminators must be connected within the maximum stub length, a specific distance defined by the ANSI SCSI standard, from the physical end of the SCSI bus. In many HA systems, termination is achieved utilizing onboard terminators incorporated into the controllers at either end of the SCSI bus.

In HA SCSI systems, difficulty arises in maintaining termination when a controller must be removed from the SCSI bus for servicing. Utilizing conventional SCSI termination methods, which provide termination at the controller, results in a loss of proper termination when either controller is disconnected. To keep SCSI buses properly terminated many systems utilize inline terminators as a solution.

One major drawback suffered by conventional inline terminators is exhibited when SCSI controllers containing long printed circuit board (PCB) bus traces or an internal channel routed to an external connector are utilized in HA systems. Both PCB traces and the internal cables used to route internal channels are frequently longer than the standard-defined four inch maximum stub length for single-ended SCSI buses. As a result, when a controller remains connected without onboard termination, conventional inline terminators fail to terminate the bus within the required distance from its physical end. If an inline terminator is utilized in conjunction with the onboard terminator of the SCSI controller, sometimes called "double termination", SCSI bus misoperation will also result. Finally, an activated inline terminator added to the end of the bus manually following the disconnection of a controller renders the SCSI bus temporarily unterminated and similarly susceptible to failure.

Consequently, it would be desirable to provide a method and system for automatically providing termination on a SCSI I/O bus while avoiding the above enumerated problems with conventional in-line termination.

SUMMARY OF THE INVENTION

In view of the foregoing, it is therefore an object of the present invention to provide an improved method and system for providing access to a peripheral device within a data processing system.

It is another object of the present invention to provide an improved method and system for providing access to a SCSI peripheral device within a data processing system.

It is yet another object of the present invention to provide an improved method and system for providing access to a peripheral SCSI device by automatically providing termination to a SCSI I/O bus.

The foregoing objects are achieved as is now described. In accordance with the method and system of the present invention, an inline terminator is provided for use within a data processing system. The inline terminator provides a connection between a first controller and an I/O bus utilizing a plurality of connection pins including a device removal detection pin. In one embodiment, power is supplied from the I/O bus to the controller's onboard terminator utilizing the inline terminator. The inline terminator includes a terminator circuit and a control circuit coupled to the device removal detection pin to detect whether the controller and bus are connected. In one embodiment, the device removal detection pin is a short ground pin on the SCSI bus that is not associated with a signal or differential signal pair. The terminator circuit is activated when the controller and bus are disconnected and deactivated otherwise to automatically terminate the I/O bus. All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
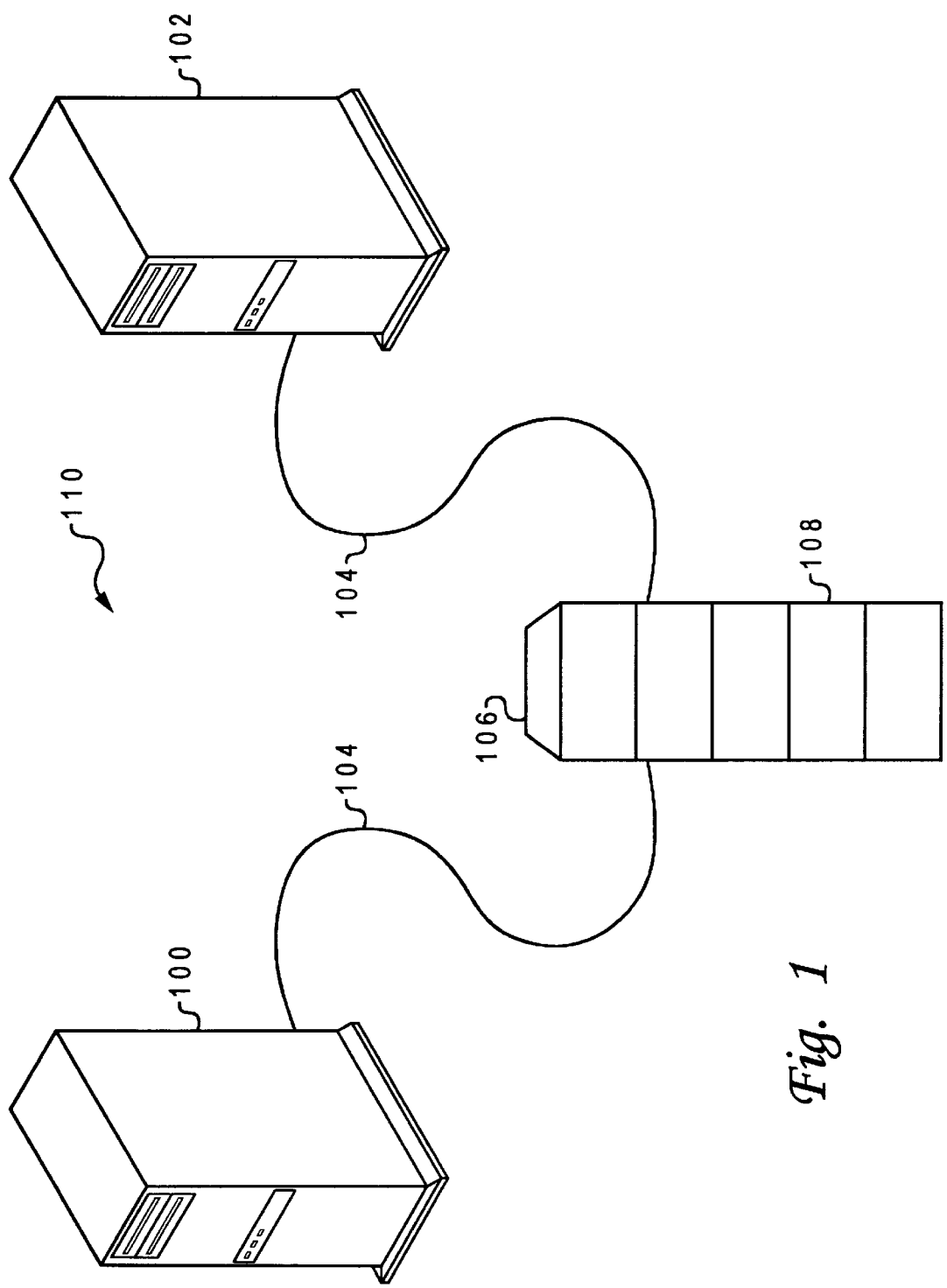
FIG. 1 illustrates a preferred embodiment of a data processing system in which the method and system of the present invention may be implemented.

With reference now to the figures and in particular with reference to FIG. 1, there is illustrated a data processing system 110 in a HA configuration including a primary host 100 and a secondary host 102, and one or more SCSI peripheral devices 106 removably coupled to both the primary host 100 and the secondary host 102 utilizing a Small Computer System Interface (SCSI) I/O bus 104.

Primary host 100 and secondary host 102 may be implemented utilizing any computers capable of supporting external SCSI peripheral devices 106 via a SCSI I/O bus 104 including workstations, personal computers or network servers such as the Netfinity 7000 server, distributed by IBM, of Armonk, N.Y., or any compatible combination thereof.

SCSI I/O bus 104 may comprise a single-ended (SE) or low voltage differential (LVD) implementation of one of the SCSI standards such as SCSI-2 promulgated by the American National Standards Institute (ANSI). Those persons skilled in the art of data processing system implementation will recognize that the present invention may be implemented with various other I/O buses requiring signal termination including "Wide" Parallel SCSI, Fibre Channel, Serial Storage Architecture (SSA), IEEE 1394 (also known as "Firewire"), or any similar I/O or CPU-Memory buses having a "daisy-chain" structure.

SCSI peripheral device 106 may comprise one or more various I/O or storage devices, including tape drives such as quarter-inch cartridge (QIC), digital audio tape (DAT), and 8 mm Tape, optical drives such as CD-ROM drives (Compact Disk Read Only Memory), CD-ROM writers, magneto-optical (MO) drives, and write-once read-many (WORM) drives, printers and scanners. However, in a preferred embodiment, peripheral device 106 comprises a bank of direct access storage devices (DASDs) 108 such as IBM Corporation's Netfinity 9.1 GB Wide Ultra SCSI Hot-Swap hard disk drive.

Figure 2:
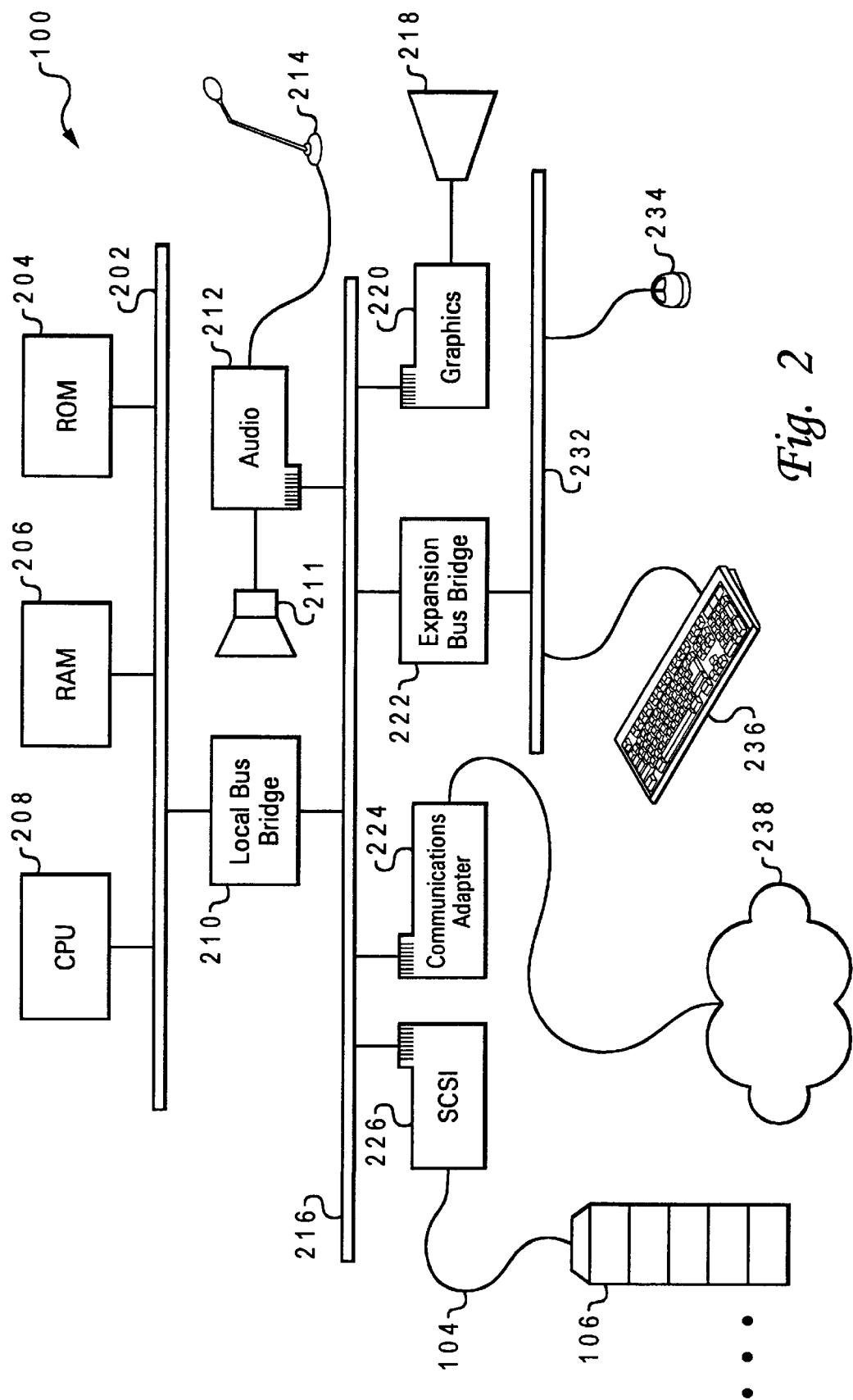
FIG. 2 depicts a high-level block diagram of a host within the data processing system of FIG. 1.

With reference now to FIG. 2, there is depicted a high-level block diagram of the structure of a host within the data processing system 110 of FIG. 1 and in particular primary host 100. Primary host 100 includes storage devices, I/O devices, and a computational and control unit such as central processing unit (CPU) 208 which interprets and executes instructions.

Storage devices include read only memory (ROM) 204, primary storage or system memory in the form of random access memory (RAM) 206 having read/write capability, as well as secondary storage such as tape, disk, or optical media devices. In a preferred embodiment, secondary storage is implemented as SCSI peripheral device 106, although it will be appreciated that various tape, disk, optical or other non-volatile memory may alternatively be utilized as secondary store.

I/O devices included within primary host 100 are utilized both to provide CPU 208 with data and instructions and to present processed data to one or more users. For example, "live" audio data may be input to primary host 100 utilizing microphone 214 and stored audio data may be output using speaker 211 both through an audio adapter or "sound card" 212.

Visual data such as text, graphics, or video is output on display device 218 via a "graphics" or display adapter 220 and may be input utilizing devices well known to those have ordinary skill in the art such as scanners, cameras or similar devices. Display device 218 may use one of any number of display mechanisms such as a cathode ray tube (CRT), an electroluminescent panel, a liquid crystal display (LCD), or the like.

Although user inputs such as text and cursor control commands may be received utilizing audio or visual input devices, keyboard 236 and pointing device 234 are most commonly utilized. Pointing device 234 may comprise a mouse (as illustrated) or such other devices as a graphics tablet, stylus, light pen, joystick, puck, or trackball.

Input and output may also be conducted to and from a network of computers or data processing systems over a network 240. Communication facilities for arbitrating use of such networks are provided in part by a communications adapter or "network interface card" (NIC) 224. In a preferred embodiment of the present invention, primary host 100 and secondary host 102 are each coupled to such a network 238 acting as servers, providing access to SCSI peripheral device 106.

Primary host 100 also includes a system bus 202, as well as several other buses devoted to I/O operations including expansion bus 232 and local bus 216 coupled together and arbitrated by local bus bridge 210 and expansion bus bridge 222. Local bus 216 may be implemented as a peripheral component interconnect (PCI) local bus, VL (Video Electronics Standards Association Local) bus or the like. Expansion bus 232 may be implemented as an Industry Standard Architecture (ISA), Extended Industry Standard Architecture (EISA), Video Electronics Standards Association Local (VESA), Microchannel Architecture (MCA), AT, or other expansion bus.

Primary host 100 is coupled to SCSI I/O bus 104 via SCSI controller 226. SCSI controller 226, which in the illustrated embodiment serves as the primary SCSI controller, provides access to external SCSI peripheral device 106 and may also be used to provide access to internal SCSI devices (not shown). Secondary host 102 similarly includes a secondary controller for providing access to external and internal SCSI peripheral device 106 when primary host 100 is removed, for example, for servicing or due to power loss.

Figure 3:
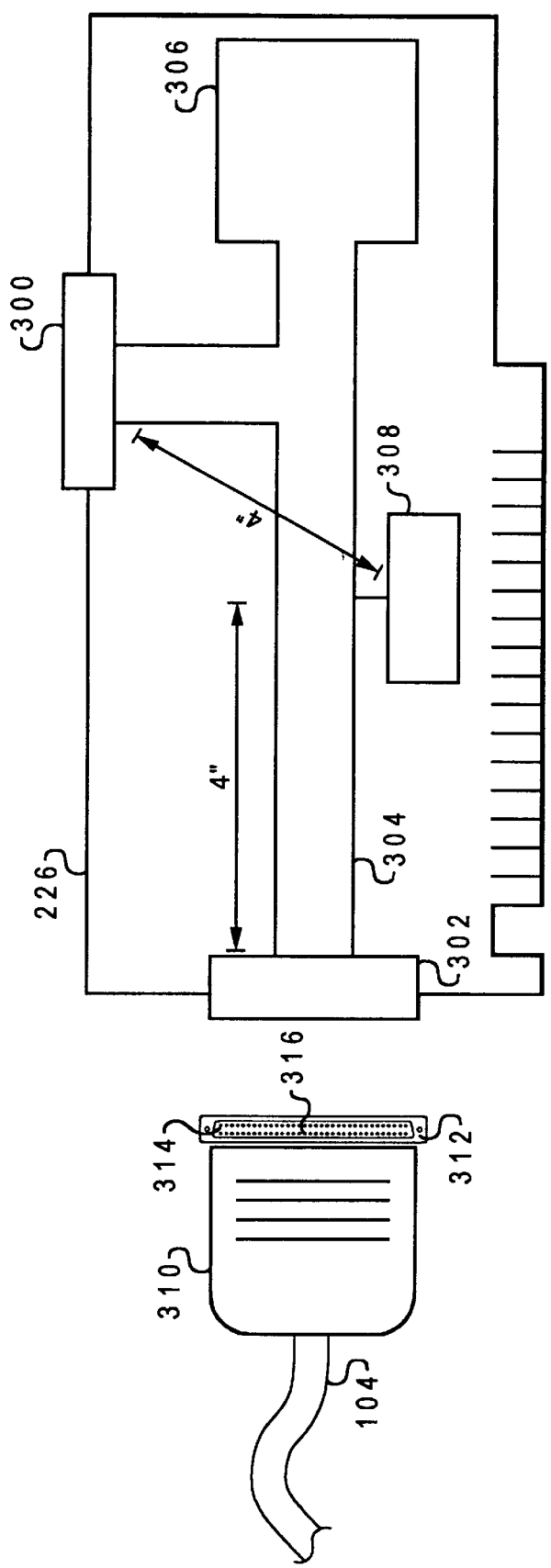
FIG. 3 illustrates a high-level schematic of the primary SCSI controller of FIG. 2 coupled to the SCSI I/O bus utilizing an inline terminator.

With reference now to FIG. 3, there is illustrated a high-level schematic of the primary SCSI controller 226 of FIG. 2 coupled to the SCSI I/O bus 104 utilizing an improved inline terminator 310 in accordance with the method and system of the present invention. Implementation of the present invention is particularly useful with SCSI controllers having the structure illustrated by FIG. 3 due to the placement of the external and internal connectors with respect to the onboard terminator 308 and the use of extension cables to couple internal connectors or "channels" to external devices.

Primary SCSI controller 226 includes internal connector 300, and external connector 302, a SCSI controller chip 306 for processing data and control signals on the SCSI I/O bus 104, and an onboard terminator circuit 308 for terminating the SCSI I/O bus 104 within the required stub length of the physical end of the SCSI I/O bus 104, internal connector 300.

If onboard terminator 308 were disabled and an conventional inline terminator (rather than the improved inline terminator 310) were utilized to terminate SCSI I/O bus 104, printed circuit board (PCB) trace length 304, would constitute an 8 inch "stub" segment of SCSI I/O bus 104. This PCB trace length 304 is twice the SCSI bus stub length allowed by the SCSI standard for single-ended SCSI buses to prevent SCSI bus misoperation. Similarly, extension cables which are often longer than 4 inches, are commonly utilized to couple internal SCSI connectors 300 to external peripheral devices 106, thereby creating long SCSI stubs, and often leading to bus misoperation.

When internal SCSI devices are provided, termination must be effected utilizing an internal terminator incorporated into or attached to the last device in the internal SCSI chain. The method and system of the present invention may still be implemented, however, even though onboard terminator chip 308 will not be utilized when internal SCSI devices are included in primary host 100.

Inline terminator 310 may be implemented as a separate device having both a male and a female connector, coupled between a standard SCSI connector (not illustrated) and SCSI controller 226, or alternatively may be incorporated into the cable comprising SCSI I/O bus 104 as a connector itself. In either case, inline terminator 310 includes a device connector 312, a plurality of connection pins 314 including at least one data pin to transmit data and control signals along the I/O bus 104, a device removal detection pin 316 to determine when the controller 226 and bus 104 are being disconnected, and a termination power pin for providing termination power from SCSI I/O bus 104 to an internal terminator within primary host 100.

In the preferred embodiment the internal terminator is onboard terminator 308; however, an internal SCSI device may be terminated and receive termination power in a similar manner to effect the method and system of the present invention. The present invention may be implemented in either single-ended or low-voltage-differential (LVD) SCSI buses, although an LVD implementation would require a pair of data pins rather than a single data pin to represent data and control signals on the SCSI I/O bus 104.

Although many methods may be utilized to detect the primary host's 100 disconnection from I/O bus 104, the preferred embodiment of the present invention utilizes a short ground pin approach. Device removal detection pin 316 is a single ground reference pin (one which is always grounded on SE or LVD SCSI controllers and target devices) isolated from and short relative to the other connection pins 314 and not associated with any signal pair.

By making device removal detection pin 316 isolated and short relative to all the other pins 314 in the connector 312, device removal detection pin 316 can be utilized to detect removal of the SCSI connector 312 prior to all the other pins 314 losing connection. This method allows onboard terminator 308 and inline terminator 310 to be briefly, simultaneously active during the removal or installation procedure. SCSI connector 312 may comprise a parallel connector, such as the 68-pin connector shown in FIG. 3, or a serial connector depending on the particular implementation.

Figure 4:
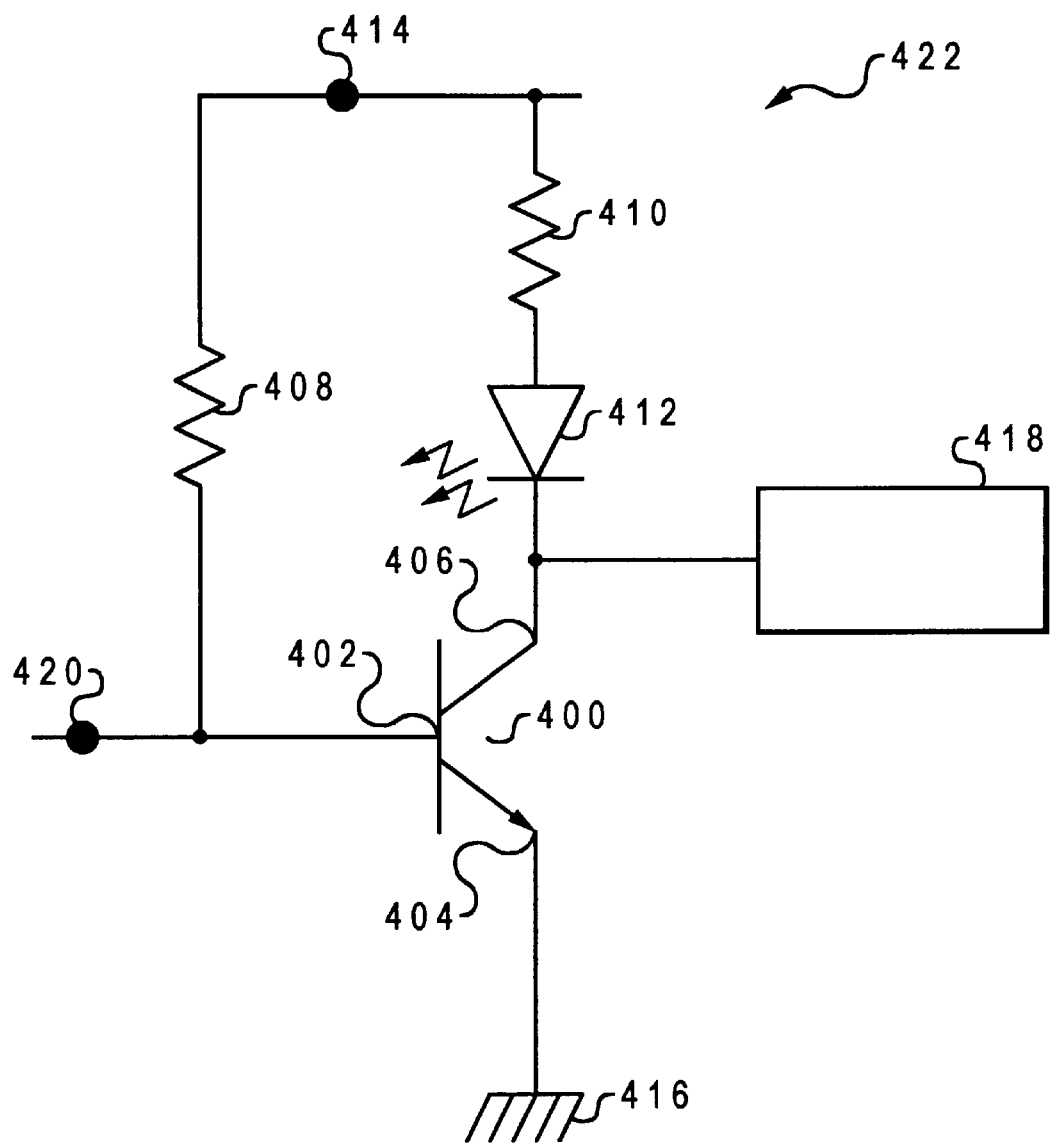
FIG. 4 is a schematic diagram depicting a circuit utilized to detect the removal of the inline terminator from the primary host and terminate the SCSI I/O bus in accordance with the method and system of the present invention.

With reference now to FIG. 4, a schematic diagram of a circuit 422 utilized to detect the removal of the inline terminator 310 from the primary SCSI controller 226 of primary host 100 and terminate SCSI I/O bus 104 in accordance with the method and system of the present invention is depicted. In a preferred embodiment of the present invention circuit 422 includes a transistor 400 having an emitter 404 connected to ground 416, a base 402 connected to device removal detection pin 316 and a 4.7K Ohm resistor 408, and a collector 406 coupled to an inline terminator circuit 418 and a 470 Ohm resistor 410. In a preferred embodiment, inline terminator circuit 418 is a conventional low active enable SCSI chip terminator.

Transistor 400 of FIG. 4 inverts the input present at node 420 to inline terminator circuit 418. Optional light emitting diode (LED) 412 may be utilized to indicate when the inline terminator circuit 418 is active. In a preferred embodiment, node 414 is connected to a termination power voltage provided from a peripheral device 106 or host 100 utilizing SCSI I/O bus 104, and node 420 is connected to device removal detection pin 316 of the SCSI connector 312. It will be apparent to those having ordinary skill in the art that the present invention may be implemented utilizing other variations of circuit 422. For example, alternative embodiments may utilize an alternative switching device in place of transistor 400 such as a PNP bipolar junction transistor (BJT) or a field effect transistor (FET) and may utilize a termination power pin rather than a ground reference pin as the device removal detection pin.

Figure 5:
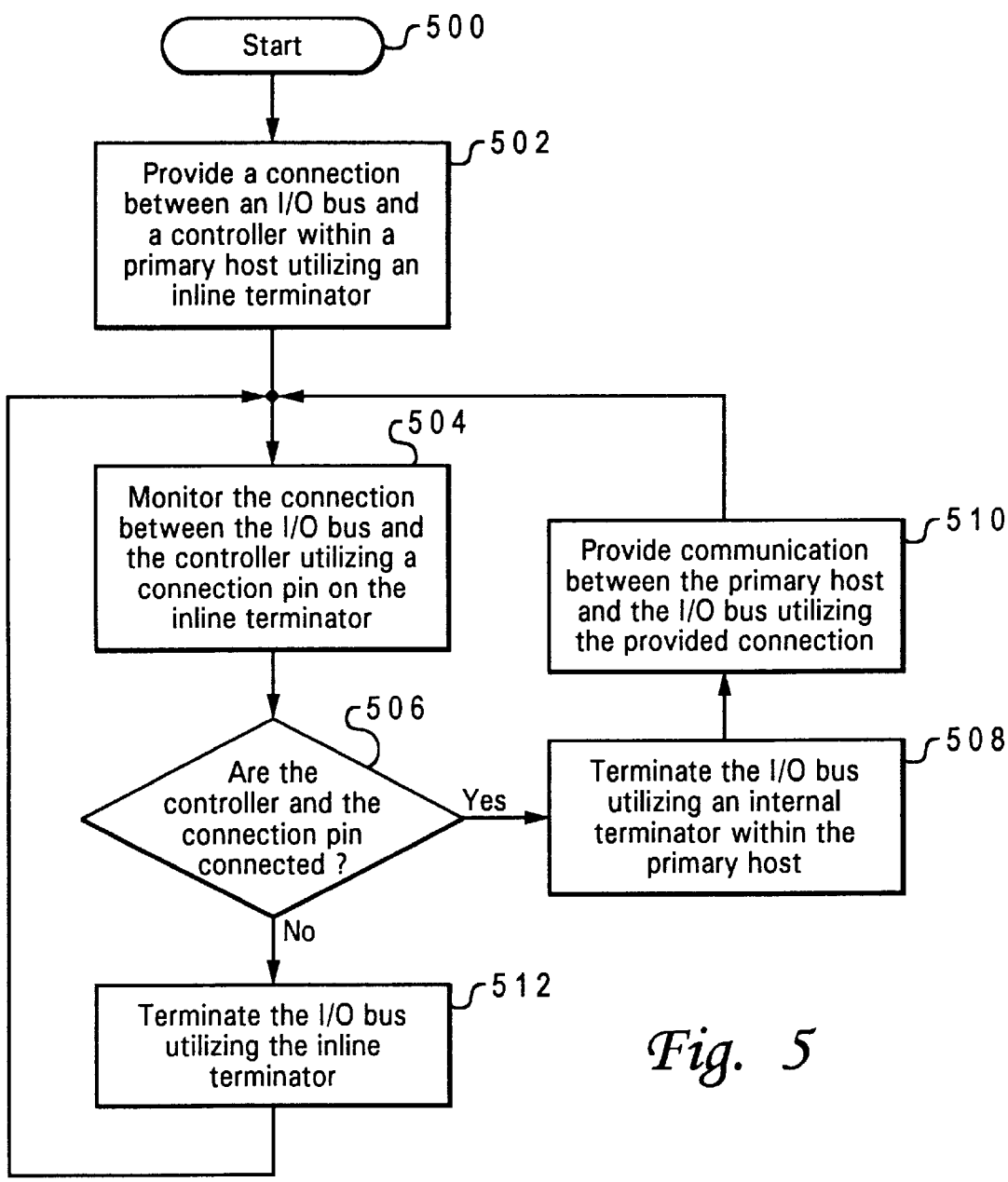
FIG. 5 is a high-level logic flow chart illustrating a process by which a data processing system may automatically provide termination on a SCSI I/O bus in accordance with the method and system of the present invention.

With reference now to FIG. 5, a high-level logic flow chart of a method by which data processing system 110 may automatically provide termination on SCSI I/O bus 104 in accordance with the present invention is illustrated. As shown, the process begins at block 500 and thereafter passes to block 502. At block 502 is illustrated the provision of a connection between SCSI I/O bus 104 and a controller within primary host 100, primary SCSI controller 226, utilizing an inline terminator 310 either incorporated into a SCSI connector or as a separate device interposed between a SCSI connector and primary SCSI controller 226.

Next, the provided connection between the SCSI I/O bus 104 and the primary controller 226 is monitored utilizing a connection pin, device removal detection pin 316 coupled to circuit 422 as depicted at block 504. The monitoring step depicted by block 504 permits a determination to then be made as to whether or not primary controller 226 and device removal detection pin 316 are connected as illustrated at block 506.

By making device removal detection pin 316 isolated, centrally placed, and short relative to the remaining plurality of connection pins 314, device removal detection pin 316 may be utilized to detect a disconnection of primary controller 226 from inline terminator 310 prior to the remaining plurality of connection pins 314, and therefore SCSI I/O bus 104, losing connection. If a determination is made that primary controller 226 and device removal detection pin 314 are disconnected, inline terminator 310 is utilized to terminate SCSI I/O bus 104 just prior to its disconnection from primary controller 226 as depicted at block 512. The process then returns in an iterative fashion to block 504 as shown above to detect any reconnection of primary controller 226 and SCSI I/O bus 104 through inline terminator 310.

If a determination is made that primary controller 226 and device removal detection pin 316 are connected, SCSI I/O bus 104 is terminated utilizing a conventional internal terminator within primary host 100 such as onboard terminator 308 of primary SCSI controller 226, illustrated at block 508. The connection is then utilized to provide communication between primary host 100 and SCSI I/O bus 104 as depicted by block 510. The process then returns in an iterative fashion to block 504 as shown above to detect any disconnection of primary controller 226 from SCSI I/O bus 104.

While the invention has been particularly shown and described with reference to a preferred embodiment, it will be understood by those skilled in the art that various changes in form and detail may be made therein without departing from the spirit and scope of the invention.

What is claimed is:

1. A data processing system comprising:

a bus;

a first host removably coupled to said bus utilizing a first controller;

a second host removably coupled to said bus utilizing a second controller;

separable inline terminator interposed between said first controller and said bus comprising:
      means for providing a connection between said first controller and said bus, said means for providing a connection between said first controller and said bus comprising a plurality of bus connection pins and at least one device removal detection pin which is isolated from said plurality of bus connection pins and relatively short in length relative to said plurality of bus connection pins;
      means for terminating said bus; and
      means for monitoring said connection between said first controller and said bus by means of a connection status of said at least one device removal detection pin and for actuating said means for terminating said bus.

2. The data processing system as set forth in claim 1, further comprising a peripheral input-output device removably coupled to said bus, wherein said bus comprises a SCSI input-output bus.

3. The data processing system as set forth in claim 1, wherein said first host comprises an internal terminator.

4. The data processing system as set forth in claim 3, wherein said internal terminator is incorporated into said first controller.

5. The data processing system as set forth in claim 1, wherein said at least one device removal detection pin comprises a ground reference pin.

6. An apparatus for terminating a bus within a data processing system, said data processing system having a first host removably coupled to said bus utilizing a first controller, and a second host removably coupled to said bus utilizing a second controller, comprising:

a separable inline terminator device, said separable inline terminator device comprising:
      means for providing a connection between said first controller and said bus;
      means for terminating said bus; and
      means for monitoring said connection between said first controller and said bus and actuating said means for terminating said bus in response to a state of said connection between said first controller and said bus.

7. The apparatus for terminating a bus within a data processing system as set forth in claim 6, wherein said data processing system further includes a peripheral input-output device removably coupled to said bus and said bus comprises a SCSI input-output bus.

8. The apparatus for terminating a bus within a data processing system as set forth in claim 6, wherein said first host comprises an internal terminator.

9. The apparatus for terminating a bus within a data processing system as set forth in claim 8, wherein said internal terminator is incorporated into said first controller.

10. The apparatus for terminating a bus within a data processing system as set forth in claim 6, wherein said means for providing a connection between said first controller and said bus comprises:

a device connector; and a plurality of connection pins projecting from said device connector including a data pin for providing communication between said bus and said first controller and a device removal detection pin.

11. The apparatus for terminating a bus within a data processing system as set forth in claim 10, wherein said monitoring and actuating means comprises means for determining if a connection exists between said device removal detection pin and said first controller.

12. The apparatus for terminating a bus within a data processing system as set forth in claim 11, wherein said device removal detection pin is shorter than said data pin, such that a disconnection of said device removal detection pin from said first controller is detected by said means for determining if a connection exists between said device removal detection pin and said first controller prior to a disconnection of said data pin from said first controller.

13. The apparatus for terminating a bus within a data processing system as set forth in claim 12, wherein said device removal detection pin comprises a ground reference pin.

* * * * *